(12) United States Patent
Boldyrev et al.

(10) Patent No.: US 9,398,110 B2
(45) Date of Patent: Jul. 19, 2016

(54) METHOD AND APPARATUS FOR PROVIDING STANDARD INFORMATION PROCESSING PIPELINES

(75) Inventors: Sergey Boldyrev, Söderkulla (FI); Pavandeep Kalra, Shrewsbury, MA (US)

(73) Assignee: Nokia Technologies Oy, Espoo (FI)

( * ) Notice: Subject to any disclaimer, the term of this patent is extended or adjusted under 35 U.S.C. 154(b) by 1250 days.

(21) Appl. No.: 13/278,975

(22) Filed: Oct. 21, 2011

(65) Prior Publication Data

US 2013/0103734 A1 Apr. 25, 2013

(51) Int. Cl.
*H04L 29/08* (2006.01)
*G06F 17/30* (2006.01)

(52) U.S. Cl.
CPC ...... *H04L 67/2823* (2013.01); *G06F 17/30563* (2013.01)

(58) Field of Classification Search
None
See application file for complete search history.

(56) References Cited

U.S. PATENT DOCUMENTS

| | | | |
|---|---|---|---|
| 6,212,524 B1 | 4/2001 | Weissman et al. | |
| 7,051,334 B1 * | 5/2006 | Porter et al. | 719/313 |
| 7,299,216 B1 * | 11/2007 | Liang et al. | |
| 8,311,974 B2 * | 11/2012 | Gong | 707/602 |
| 8,352,505 B1 * | 1/2013 | Venkataramani et al. | 707/802 |
| 2002/0120630 A1 | 8/2002 | Christianson et al. | |
| 2007/0124322 A1 * | 5/2007 | Meyer | G06F 17/3002 |
| 2007/0179760 A1 * | 8/2007 | Smith | 703/2 |
| 2007/0239636 A1 | 10/2007 | Tang et al. | |
| 2008/0059625 A1 | 3/2008 | Barnett et al. | |
| 2009/0319645 A1 | 12/2009 | Boldyrev et al. | |
| 2010/0169345 A1 | 7/2010 | Boldyrev et al. | |
| 2011/0258532 A1 * | 10/2011 | Ceze et al. | 715/234 |
| 2012/0016901 A1 | 1/2012 | Agarwal et al. | |

OTHER PUBLICATIONS

Berlekamp, E. R., Factoring Polynomials Over Large Finite Fields, Mathematics of Computation, vol. 24, No. 111, Jul. 1970, pp. 713-735.
Dubois, D., et al., On the use of aggregation operations in information fusion processes, Fuzzy Sets and Systems, vol. 142, 2004, pp. 143-161.
Dubois, D., et al., Ordinal and Probabilistic Representations of Acceptance, Journal of Artificial Intelligence Research, vol. 22, 2004, pp. 23-56.

(Continued)

*Primary Examiner* — Thomas Dailey
(74) *Attorney, Agent, or Firm* — Alston & Bird LLP (57) ABSTRACT

An approach is provided for providing standard information processing pipelines. A standard pipeline generation platform processes and/or facilitates a processing of one or more information sources to cause an extraction of one or more least meaningful data components. The standard pipeline generation platform also causes a transformation of the one or more least meaningful data components into one or more isomorphic representations. The standard pipeline generation platform further causes a compilation of one or more data repositories comprising the one or more isomorphic representations, wherein the one or more data repositories are available for processing by one or more services, one or more applications, or combination thereof. The standard pipeline generation platform also causes a loading of the one or more data repositories, the one or more isomorphic representations, or a combination thereof into the one or more information sources following the processing.

18 Claims, 7 Drawing Sheets

(56) References Cited

OTHER PUBLICATIONS

Ponomaryov, D., A Decomposability Criterion for Elementary Theories, Sibirsk. Mat. Zh., vol. 49, No. 1, 2008, pp. 189-192.
Rabin, M., Efficient Dispersal of Information for Security, Load Balancing, and Fault Tolerance, Journal of the ACM, vol. 36, No. 2, 1989, pp. 335-348.
Rabin, M., Probabilistic Algorithms in Finite Fields, SIAM Journal on Computing, vol. 9, No. 2, Jan. 1979, pp. 273-280.
Shoup, V., New Algorithms for Finding Irreducible Polynomials over Finite Fields, Mathematics of Computation, vol. 54, Jan. 31, 1989, pp. 435-447.
Shoup, V., On the Deterministic Complexity of Factoring Polynomials over Finite Fields, Computer Science Technical Report No. 782, University of Wisconsin-Madison, Feb. 21, 1989, pp. 1-10.
Jamil, Hasan, *Computing Subgraph Isomorphic Queries Using Structural Unification and Minimum Graph Structures*, Proceedings of the 2011 ACM Symposium on applied Computing, (Mar. 2011) 1053-1058.

\* cited by examiner

METHOD AND APPARATUS FOR PROVIDING STANDARD INFORMATION PROCESSING PIPELINES

BACKGROUND

Service providers (e.g., wireless, cellular, etc.) and device manufacturers are continually challenged to deliver value and convenience to consumers by, for example, providing compelling network services. These services are leading to vast amounts of data (structured and binary) which need to be managed, stored, searched, analyzed, etc. Over the last decade, the internet services have accumulated data in the range of exabytes ($10^{16}$ bytes). Although most of this data is not structured in nature, however, it must be stored, searched and analyzed appropriately before any real time information can be drawn from it for providing services to the users.

In order to apply analytics (e.g., statistical analysis) on the data and gain insight into the data, the data need to be put into an analytics engine through various ingestion schemes. The data is typically received in an unstructured format at the time it is ingested. It then needs to be cleansed, structured and validated into a format that is conducive for analysis. In order to cleanse the data and make it available for analytics, the data goes through a pipeline of disparate systems. Considerably high amounts of time and resources are spent on providing a pipeline through disparate systems for each data source that is brought into the system. This is the most time consuming and labor intensive work in order to get the data ready for analysis. Typically, developers write various custom map reduce programs to cleanse the data. However if the data could be reflected in terms of some standard data models and cleansing processes, it would be possible to create a standard pipeline and greatly streamline the Extraction, Transformation, Load (ETL) process which is easily the biggest obstacle and time consuming area of analytics.

SOME EXAMPLE EMBODIMENTS

Therefore, there is a need for an approach for providing standard information processing pipelines.

According to one embodiment, a method comprises processing and/or facilitating a processing of one or more information sources to cause, at least in part, an extraction of one or more least meaningful data components. The method also comprises causing, at least in part, a transformation of the one or more least meaningful data components into one or more isomorphic representations. The method further comprises causing, at least in part, a compilation of one or more data repositories comprising, at least in part, the one or more isomorphic representations, wherein the one or more data repositories are available for processing by one or more service, one or more applications, or combination thereof. The method also comprises causing, at least in part, a loading of the one or more data repositories, the one or more isomorphic representations, or a combination thereof into the one or more information sources following the processing.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more information sources to cause, at least in part, an extraction of one or more least meaningful data components. The apparatus is also caused to cause, at least in part, a transformation of the one or more least meaningful data components into one or more isomorphic representations. The apparatus is further caused to cause, at least in part, a compilation of one or more data repositories comprising, at least in part, the one or more isomorphic representations, wherein the one or more data repositories are available for processing by one or more service, one or more applications, or combination thereof. The apparatus is also caused to cause, at least in part, a loading of the one or more data repositories, the one or more isomorphic representations, or a combination thereof into the one or more information sources following the processing.

According to another embodiment, a computer-readable storage medium carries one or more sequences of one or more instructions which, when executed by one or more processors, cause, at least in part, an apparatus to process and/or facilitate a processing of one or more information sources to cause, at least in part, an extraction of one or more least meaningful data components. The apparatus is also caused to cause, at least in part, a transformation of the one or more least meaningful data components into one or more isomorphic representations. The apparatus is further caused to cause, at least in part, a compilation of one or more data repositories comprising, at least in part, the one or more isomorphic representations, wherein the one or more data repositories are available for processing by one or more service, one or more applications, or combination thereof. The apparatus is also caused to cause, at least in part, a loading of the one or more data repositories, the one or more isomorphic representations, or a combination thereof into the one or more information sources following the processing.

According to another embodiment, an apparatus comprises means for processing and/or facilitating a processing of one or more information sources to cause, at least in part, an extraction of one or more least meaningful data components. The apparatus also comprises means for causing, at least in part, a transformation of the one or more least meaningful data components into one or more isomorphic representations. The apparatus further comprises means for causing, at least in part, a compilation of one or more data repositories comprising, at least in part, the one or more isomorphic representations, wherein the one or more data repositories are available for processing by one or more service, one or more applications, or combination thereof. The apparatus also comprises means for causing, at least in part, a loading of the one or more data repositories, the one or more isomorphic representations, or a combination thereof into the one or more information sources following the processing.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing standard information processing pipelines are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term Extract-Transform-Load (ETL) refers to a process that is used to take information from one or more sources, normalize it in some way to some convenient schema, and then insert it into some other repository. A common use of ETL process is for data warehousing, where regular updates from one or more systems are merged and refined so that analysis can be done using more specialized tools. Typically the same process is run over and over, as new data appears in the source application(s). Furthermore, the term ETL pipeline refers to a set of data processing elements associated with the ETL process and connected in series, so that the output of one element is the input of the next element. Although various embodiments are described with respect to ETL, it is contemplated that the approach described herein may be used with other processes, methods and tools for data integration and data cleansing.

As used herein, the term "computation closure" identifies a particular computation procedure together with relations and communications among various processes including passing arguments, sharing process results, selecting results provided from computation of alternative inputs, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "information sources" refers to an aggregated set of information (e.g. information spaces) and computation closures (e.g. computation spaces) from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

Figure 1:
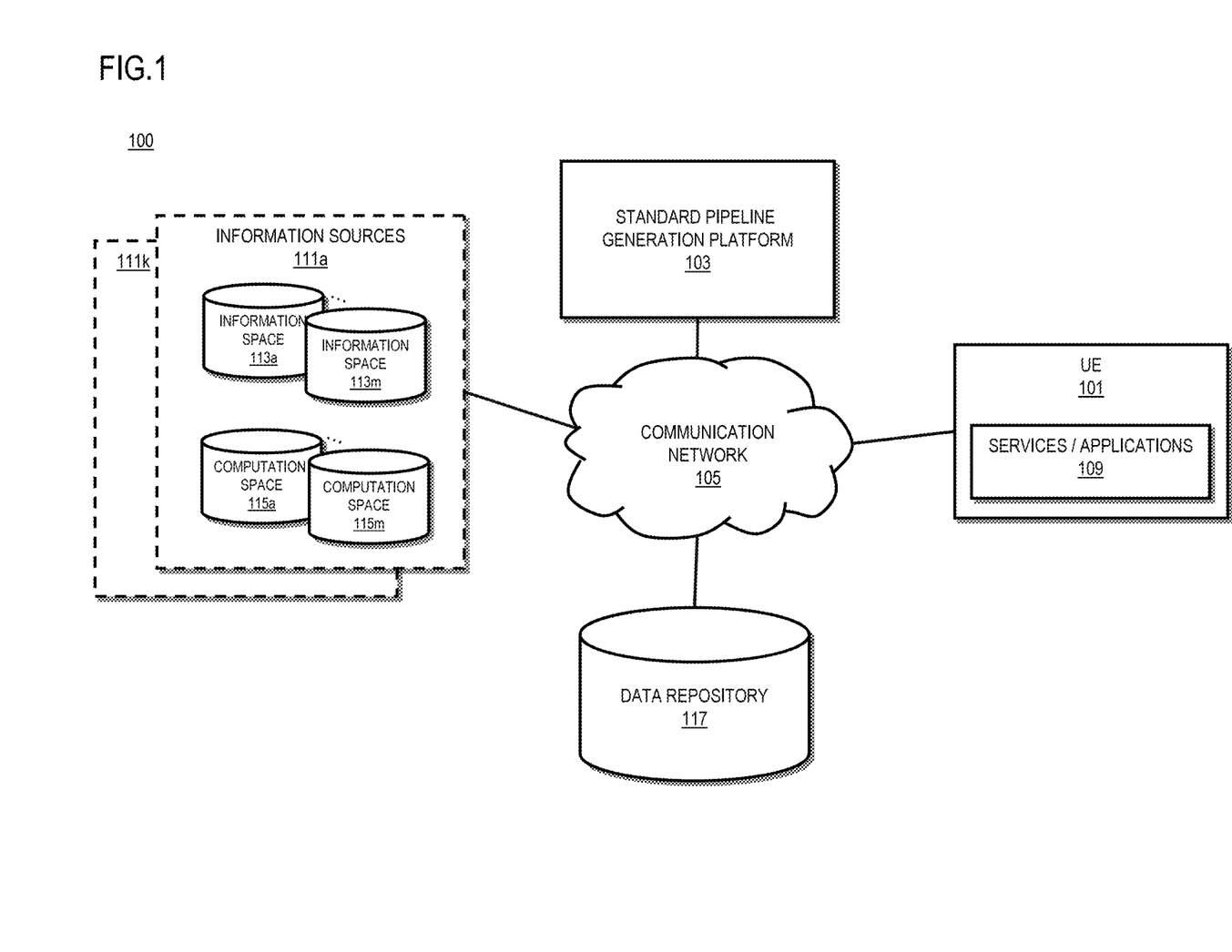
FIG. 1 is a diagram of a system capable of providing standard information processing pipelines, according to one embodiment.

FIG. 1 is a diagram of a system capable of providing standard information processing pipelines, according to one embodiment. Typically, data models and information stream reflections are constructed from non-decomposable components of information, which are the minimum components that are sustained and are of interest for further information Analysis. Moving information from the original domain of the original state and transforming it into isomorphic representation gives the opportunity to construct a dynamic Extract-Transform-Load (ETL) pipeline and to process information in terms of the domain where it can be done in a most efficient way. Therefore, a standard analytics pipeline can be defined, giving the ability to Extract, Transform and Load back information to the stream (presented as a number of finite or transitive closures) in secure and efficient manner.

Additionally, based on decomposability criterion for elementary theories and partition-based logical reasoning for first-order and propositional theories, any set of facts can be recognized as decomposable computation closures in the frame of corresponding signatures. If such computation closures are in predicate calculus of all sets of the facts of some partial computation closures with orthogonal signatures, joined signatures produce complete computation closure signature.

Furthermore, if there are two non-finite computation closures such that their signatures, once united, form the signature of a finite computation closure for a particular information space, and there is a fact (subset of the facts) which is part of the finite computation closure signature, then there are at least two other facts (subset of the facts) which belong to the two non-finite computation closures, such that corresponding signatures are orthogonal to the finite computation closure signature.

As it follows, each fact (subset of the facts) of finite computation closure, which is indecomposable in that closure, contains pieces of information only from one decomposition component of the closure. This clearly allows determining of the partitioning of the signature, as well as components of closure judging from the system of rules (axioms) of closures.

Efficiency and applicability of the presented approach can be illustrated by the task of deductive closure synthesis and is applicable to any information processing and analysis. It means that, if a set of facts or queries exist, the ways of access to the set, the predefined format of the facts representation (e.g., Subject-Predicate-Object, RDF triple, etc.), where one of the format fields (e.g., the Predicate) is consistent and forms necessary partial closure with a signature orthogonal to any other partial closure, then current approach can be used in case of the distributed analytics steam synthesis presented as a stream of closures.

A system 100 of FIG. 1 introduces the capability to providing standard information processing pipelines. In one embodiment, the standard pipeline generation platform 103 uses various data models to create a standardized data repository 117. The standard pipeline generation platform 103 also reflects on the data models to create a standard set of processes and uses a combination of data models, standardized data repository and the standard processes to define a standard Pipeline over disparate systems that communicate with each other via the communication network 105.

In one embodiment, any valid irreducible polynomial with corresponding key can serve the role for the signatures creation and validation of computation closures. Since the process of polynomial synthesis is characterized by orthogonal properties (by definition of such process) the following approach can be elaborated.

It is noted that, facts can be inserted or removed and queries can be inserted or satisfied. Additionally, facts and queries can be disseminated in a skewed/non-uniform fashion, as well as aggregated. As a result, any information instance in an information source 111a-111k can be represented by means of encoded sequences, for example as a vector, using the following procedure. Furthermore, the information sources 111a-111k may include information spaces 1113a-113m, computation spaces 115a-115m, or a combination thereof, wherein the data is stored in information spaces 113a-113m while the program codes, scripts, or software that process and maintain the data are provided by the computation spaces 115a-115m.

In one embodiment, the first step of the procedure (e.g. extraction phase) includes considering a set of aggregate queries $Q=\{q_1, \ldots, q_m\}$ over a set of k distinct information sources 111a-111k, wherein a set of information sources 111a-111k readings is a vector $x=\langle x_1, \ldots, x_k \rangle \in \mathfrak{R}^k$. The information sources 111a-111k can be defined by means of structured or unstructured information entities, for example RDF format or binary multimedia stream.

In one embodiment, a query may request an aggregate value of some subset of the information sources 111a-111k at some desired frequency. In one embodiment, the standard pipeline generation platform 103 represents each query as a k-bit vector, wherein the value of an element j of the vector is 1, if $x_j$ contributes to the value of $q_j$, and 0 otherwise. The value of query $q_j$ on information source 111a-111k readings x is expressed as the dot product $q_j \cdot x$. The result is then taken as input parameters of a certain polynomial form.

In one embodiment, upon determining the information source vector against the information sources 111a-111k, a verification or check may be performed with respect to the information source vector by determining whether an equivalence class may be generated. In this regard, once queries are defined against the information sources, an assumption may be made that all the sets of aggregated queries in the workload have the same frequency. In other words, $$\frac{1}{Q_{WL_1}^I} = \frac{1}{Q_{WL_1}^{II}} = \cdots = \frac{1}{Q_{WL_1}^i}$$

wherein, $Q_{WL_1}$ is the workload of a set of aggregated queries. Accordingly, since the aggregated queries have the same frequency, the union of all regions (e.g., information sources) covered by the same set of aggregated queries may be defined by standard pipeline generation platform, as an equivalence class which forms the information set. For example, the set of queries $\{q_1, q_2, q_3\}$ may be represented as $\{EC_1, EC_2, EC_3, EC_4\}$ which can be covered by $q_2$ and $q_3$, and can be represented as $[0,0,1]^T$.

In one embodiment, when an information source vector (information stream) is created and checked via generation of the equivalence class, the standard pipeline generation platform 103 can deterministically generate an irreducible polynomial over the set of equivalence class of a certain degree. Construction of the equivalence class means that there is an irreducible polynomial f over the finite field F of degree m. Therefore, if m is the prime factorization, then the construction of polynomials will be first over the finite field F of degree $q_1^{e^i}$ for i=1, ..., r, and then can be combined to form an irreducible polynomial of degree m.

In one embodiment, upon completion of the extraction procedure, the generated irreducible polynomial is used by the standard pipeline generation platform 103 as a productization dispersing mechanism. Since irreducible polynomials can be created by means of factoring algorithms, resulted irreducible factor can be represented as the product of certain number of distinct irreducible polynomials of defined degree.

In one embodiment, the standard pipeline generation platform 103 factors the cyclotomic polynomial $\Phi_q = X^{q-1} + \ldots + 1$, obtaining an irreducible polynomial of degree m. This procedure produces finite field and a primitive q-th root of particular unity in that field. On the other hand, a finite field is a cyclic group of order $p^m - 1$, meaning that the construction is reduced to finding roots of polynomials of the form $X^q - c$ over the finite field.

In one embodiment, the standard pipeline generation platform 103 can inductively define a sequence of irreducible polynomials $f^{(1)}, \ldots, f^{(k)}$ in F of degree m where the roots are primitive $q^i$-th roots of unity.

In one embodiment, the standard pipeline generation platform 103 uses a deterministic factoring algorithm and the procedure described above, to deterministically generate a constructed irreducible polynomial that is the product of k distinct irreducible polynomials of degree 1 in finite field F. This means that particular information transfer can be represented through an accumulated set of distinct irreducible polynomials and can be translated into one irreducible polynomial. Therefore, a most relevant first-order logic computation closure, which is a set of information (e.g., facts or queries) with redundancy, can be represented as a certain form of polynomial.

In one embodiment, the task of the common computation closure calculation is reduced to the task of irreducible polynomial updates. Once an irreducible polynomial f of degree m by factoring the cyclotomic polynomial $\Phi_q = X^{q-1} + \ldots + 1$ is constructed, it can be randomly updated. In one embodiment, algorithms are used that can completely factor $\phi_q$ using n random or provided field elements in $(n \log p)^{O(1)}$ steps.

In one embodiment, any further checking against consistency of synthesized polynomials and aligning them with dissemination and aggregation policies/strategies can be done. The procedure described above shapes the process of information transformation. The processes of dissemination and aggregation are having the same breakpoints as shown above.

As shown in FIG. 1, the system 100 comprises a user equipment (UE) 101 having connectivity to standard pipeline generation platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the process of information transformation is bi-directional, meaning that information can be transformed back and forth between original and polynomial domains.

In one embodiment, the deductive closure synthesis becomes feasible and can be an outcome of the above procedure and therefore, providing a baseline for distributed analytics ETL pipeline construction.

In one embodiment, considering the task of irreducible polynomial updates, the process of deductive closure synthesis (facts closure generation) plays the role of the updating rule of irreducible polynomial. These updates are done in aggregated fashion and each update can be easily monitored and checked against usefulness. Furthermore, if any of the updates cannot contribute any useful information, during computation closure generation, that irreducible factor can be ignored as well as those relevant dispersed facts.

In one embodiment, the mechanism provided for standard information processing pipelines enables shaping of core information, for example one or more deductive closures, and tracking/keeping the most relevant facts inside the certain information area. Such information core is assembled by means of the most useful pieces of information, independent from the original type (both types structured and unstructured), thus could be static, dynamic or a combination thereof.

By way of example, the UE 101, and the standard pipeline generation platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
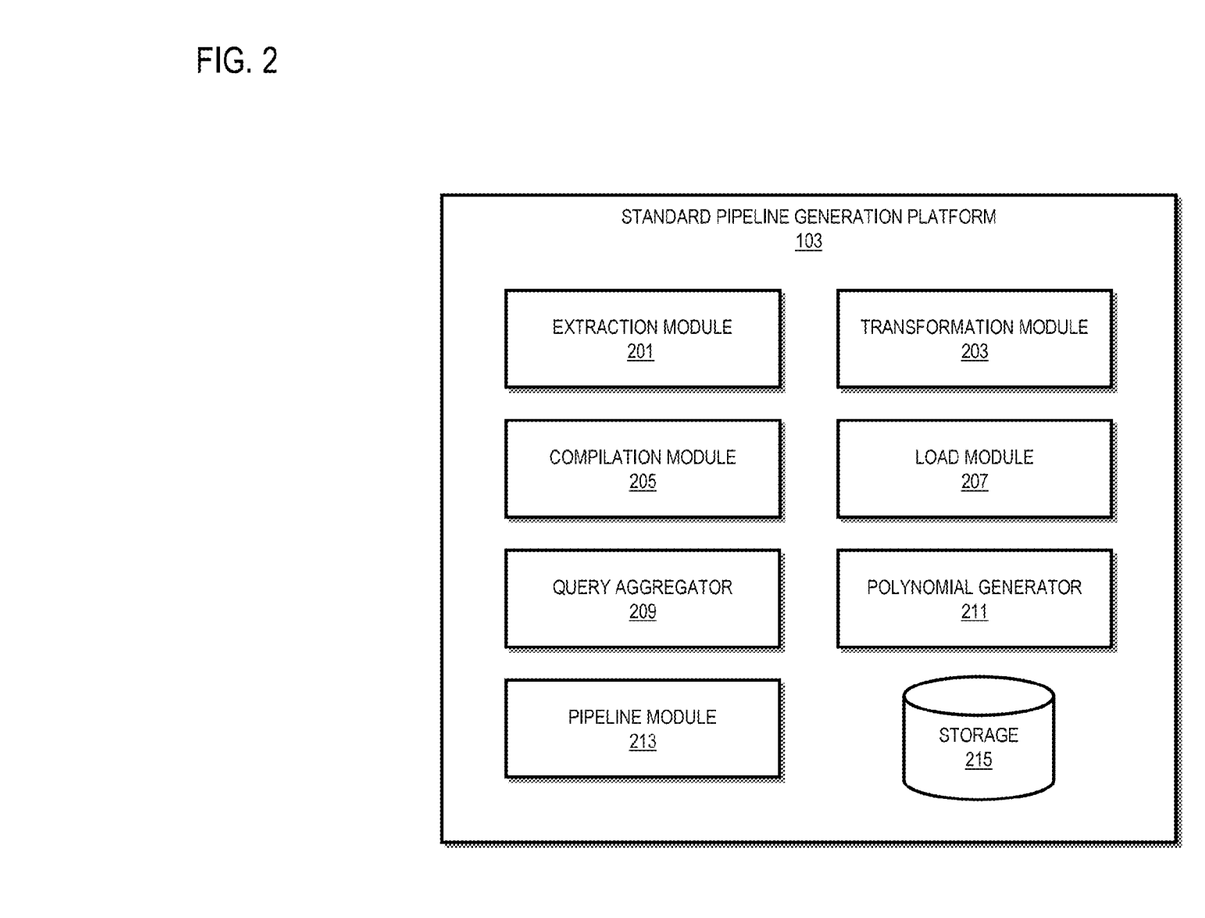
FIG. 2 is a diagram of the components of a standard pipeline generation platform, according to one embodiment.

FIG. 2 is a diagram of the components of a standard pipeline generation platform, according to one embodiment. By way of example, the standard pipeline generation platform includes one or more components for providing standard information processing pipelines. It is contemplated that the functions of these components may be combined in one or more components or performed by other components of equivalent functionality. In this embodiment, the standard pipeline generation platform includes an extraction module 201, a transformation module 203, a compilation module 205, a load module 207, a query aggregator 209, a polynomial generator 211, a pipeline module 213, and a storage 215.

Figure 3:
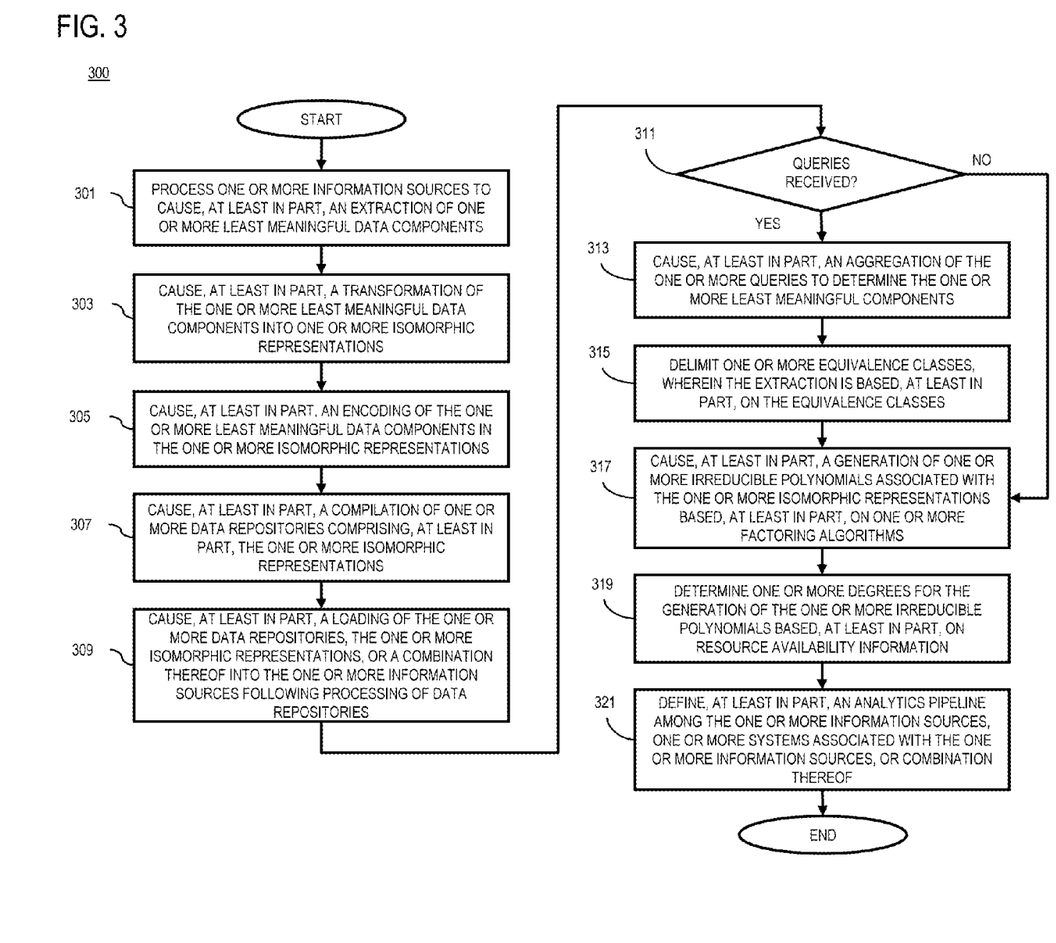
FIG. 3 is a flowchart of a process for providing standard information processing pipelines, according to one embodiment.
Figure 4:
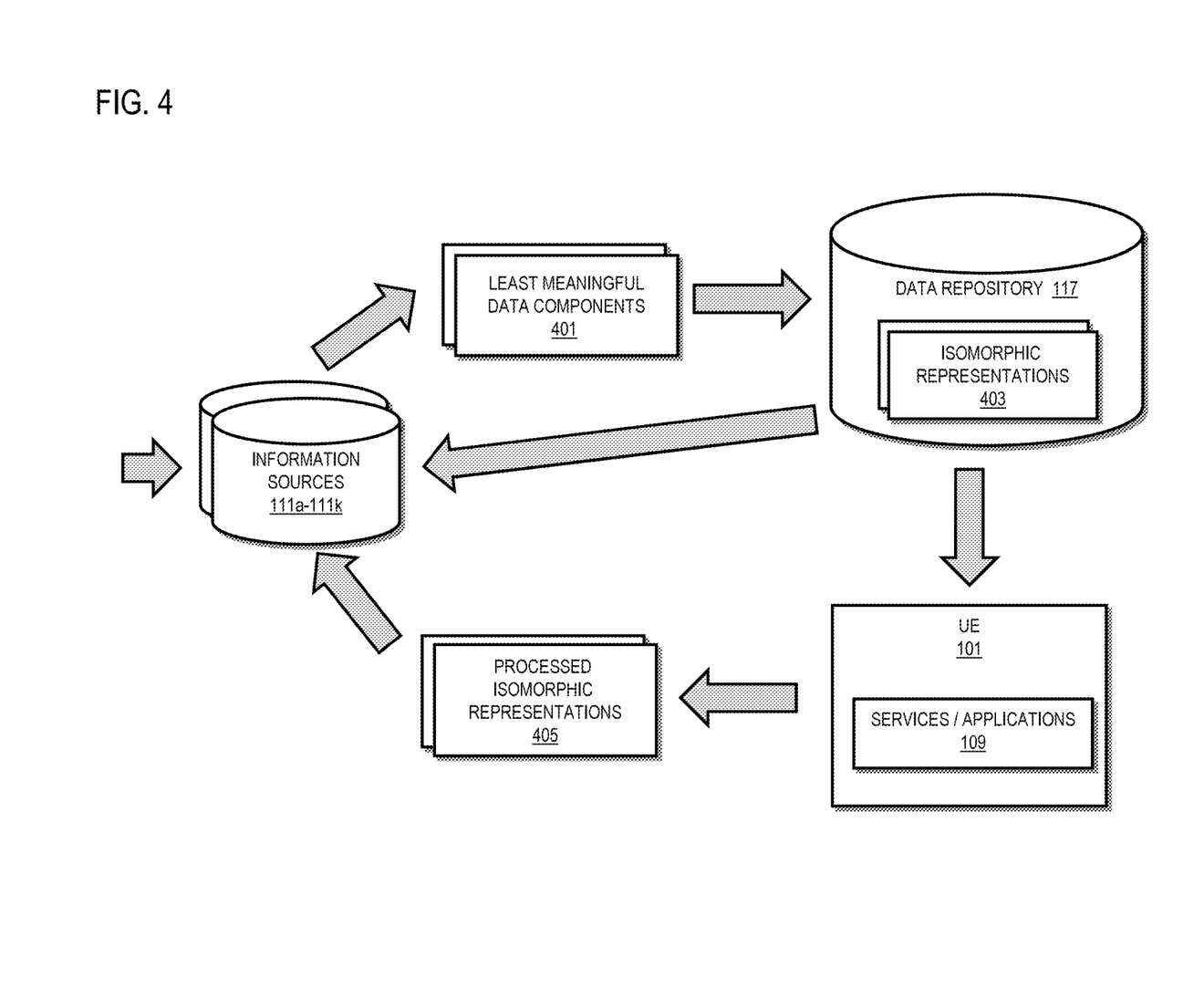
FIG. 4 is a flow diagram of a process for providing standard information processing pipelines, according to one embodiment.
Figure 6:
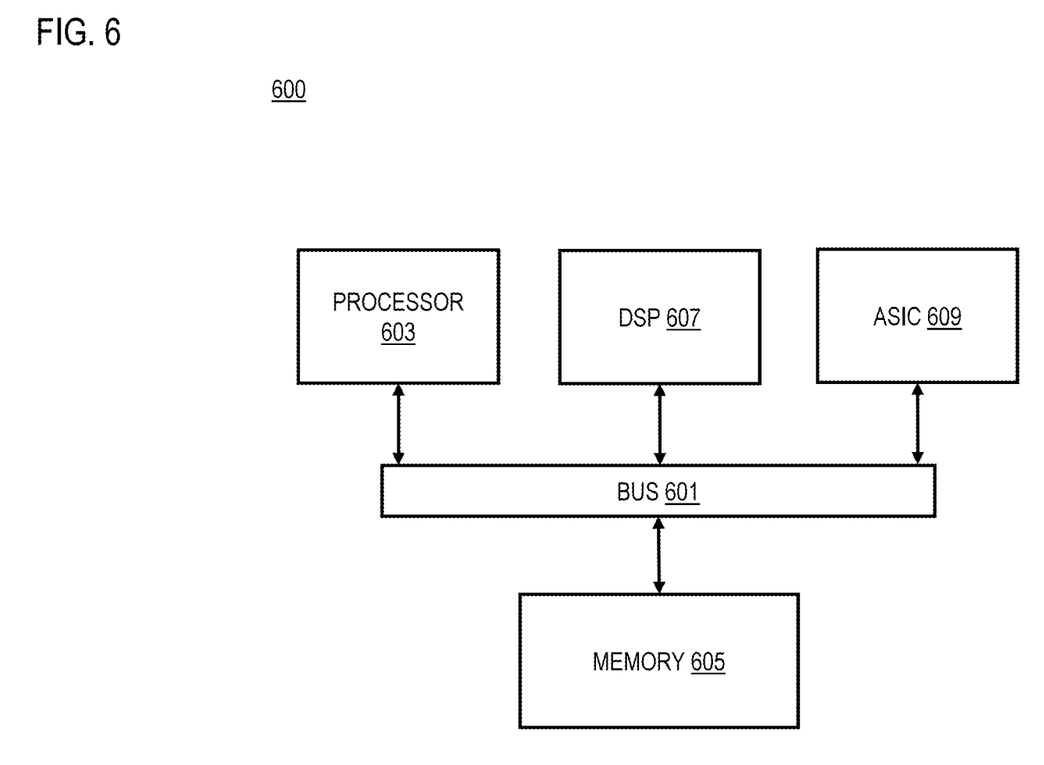
FIG. 6 is a diagram of a chip set that can be used to implement an embodiment of the invention.

FIG. 2 is described with reference to FIGS. 3 and 4, wherein FIG. 3 shows a flowchart 300 of a process for providing standard information processing pipelines, according to one embodiment and FIG. 4 shows a flow diagram of the process. In one embodiment, the standard pipeline generation platform 103 performs the process 300 and is implemented in, for instance, a chip set including a processor and a memory as shown in FIG. 6.

In one embodiment, the least meaningful data component is defined as the smallest components of a lossless decomposition of serialized information stream (for example in RDF) which does not take into account inference (any methods for detecting identity of structural components of the serialized information stream). Furthermore, in some embodiments, the isomorphic representation is a bijection of one domain onto another domain while preserving, for instance, the original topology structure, order, relations, and operations.

In one embodiment, per step 301 of process 300 of FIG. 3, the extraction module 201 processes and/or facilitating a processing of one or more information sources 111a-111k to cause, at least in part, an extraction of one or more least meaningful data components (shown as 401 in FIG. 4). The one or more least meaningful data components are data components that cannot be broken any further into smaller meaningful components of data. The one or more least meaningful data components 401 may be stored in storage 215, in a data repository 117 or a combination thereof. In one embodiment, the one or more least meaningful data components are associated with one or more different domains (e.g. associated with different services, applications, etc.)

In one embodiment, per step 303 of FIG. 3, the transformation module 203 causes, at least in part, a transformation of the one or more least meaningful data components 401 into one or more isomorphic representations 403. The one or more isomorphic representations may be stored in storage 215, in a data repository 117 or a combination thereof. The isomorphic representations of the least meaningful data components 401 can be considered as standardized equivalents of the data components.

In one embodiment, the transformation may be bi-directional with respect to a first set of one or more domains associated with the one or more information sources 111a-111k and a second set of one or more domains associated with the one or more data repositories 117, the one or more isomorphic representations 403, or a combination thereof.

In one embodiment, per step 305 of FIG. 3, the transformation module 203 causes, at least in part, an encoding of the one or more least meaningful data components 401 in the one or more isomorphic representations 403, wherein information associated with the one or more least meaningful data components 401 are protected from disclosure by the one or more isomorphic representations 403 based, at least in part, on the encoding. The encoded data components cannot be accessed by unauthorized parties but the unauthorized party may be able to apply rules on the data, within the environment of a standard pipeline generated by the standard pipeline generation platform 103. The encoded isomorphic representations may be stored in storage 215, in a data repository 117 or a combination thereof.

In one embodiment, per step 307 of FIG. 3, the compilation module 205 causes, at least in part, a compilation of one or more data repositories 117 comprising, at least in part, the one or more isomorphic representations 403, wherein the one or more data repositories 117 are available for processing by one or more services, one or more applications, or combination 109 thereof. It is noted that the services and applications may be provided to the UE 101 by various providers (not shown) via the communication network 105.

In one embodiment, per step 309 of FIG. 3, the load module 207 causes, at least in part, a loading of the one or more data repositories 117, the one or more processed isomorphic representations 405, or a combination thereof into the one or more information sources 111a-111k following the processing.

In various embodiments, the processed isomorphic representations 405 stored in information sources 111a-111k may be accessed and reused by the services/applications 109 without the need for repeating the Extraction-Transformation-Load (ETL) process.

In one embodiment, per step 311 of FIG. 3, the query aggregator 209 determines whether queries over the one or more information sources 111a-111k have been received. If queries have been received, the query aggregator 209 determines one or more queries.

In one embodiment, per step 313 of FIG. 3, the query aggregator 209 causes, at least in part, an aggregation of the one or more queries to determine the one or more least meaningful data components 401. In one embodiment, the query aggregator 209 may provide the aggregated queries to the extraction module 201 and the extraction module 201 can use the aggregated queries for determining the one or more least meaningful data components 401.

In one embodiment, per step 315 of FIG. 3, the one or more queries, the aggregation of the one or more queries determined by the query aggregator 209, or a combination thereof delimit one or more equivalence classes, wherein the extraction of the one or more least meaningful data components 401 is based, at least in part, on the equivalence classes. The equivalent class for each component a in the one or more least meaningful data components 401 is a set of components which are equivalent of a.

In one embodiment, the one or more isomorphic representations 403 may include, at least in part, one or more irreducible polynomials, wherein an irreducible polynomial cannot be expresses as the product of two or more non-trivial factors in a given set and represent least meaningful data components 401.

In one embodiment, per step 317 of FIG. 3, the polynomial generator 211 causes, at least in part, a generation of the one or more irreducible polynomials based, at least in part, on one or more factoring algorithms. A factoring algorithm determines the prime factors of the one or more isomorphic representations 403 and the polynomial generator 211 can use the prime factors for generating the irreducible polynomials.

In one embodiment, per step 319 of FIG. 3, the polynomial generator 211 determines one or more degrees for the generation of the one or more irreducible polynomials based, at least in part, on resource availability information, such as for example processor availability, memory availability, bandwidth availability, power availability, etc. or a combination thereof. The degrees of irreducible polynomials impacts the pipeline performance, in the sense that an irreducible polynomial with a higher degree can include more polynomials with orthogonal elements and reduces the need to reconstruction of polynomials and as a result improves the pipeline performance.

In one embodiment, per step 321 of FIG. 3, the pipeline module 213 utilizes the extraction by the extraction module 201, the transformation by the transformation module 203, the loading by the load module 207, or a combination thereof to define, at least in part, an analytics pipeline among the one or more information sources 111a-111k, one or more systems associated with the one or more information sources (e.g., service providers), or combination thereof.

In one exemplary embodiment, a user of UE 101 may tag a number of photos (N photos) and query about relevancy among the tagged N photos and a specified location L. Since photos are represented as binary data, the binary data may not be carried into the pipeline. In one embodiment, certain references to the binary data may be constructed and serialized, for example as RDF graphs.

In one embodiment, an RDF graph representing the N photos may include N nodes each of which including description of one of the N photos along with location, notation, or other descriptive meta-data. The RDF graph may be in information sources 111a-111k.

In one embodiment, the set of least meaningful data components 401 for the RDF graph can be created as a grounded area of the RDF graph.

In one embodiment, a template for the grounded area may be created by the extraction module 201 and stored in storage 215. In other embodiments, the RDF graph may be parsed for creating its least meaningful set of data components.

In one embodiment, queries against the content, such as for example queries regarding photos close to location L, can be received and serialized by the query aggregator 209.

In one embodiment, the equivalence classes are evaluated by the query aggregator 209. The desired degree of one or more polynomials for generating the isomorphic representation 403 of the least meaningful data is determined by the polynomial generator 211 based on the complexity of the associated computation. The polynomial generator 211 constructs the irreducible polynomials based on one or more factoring algorithms.

In one embodiment, the transformation module 203 transforms the least meaningful data components 401 into the isomorphic representations 403 using the irreducible polynomials.

In one embodiment, the load module 207 utilizes the irreducible polynomials for processing the isomorphic representations 403 in to processed isomorphic representations 405 and loading them back into the information sources 111a-111k.

In one embodiment, the polynomials can be recombined depending on the resource availability, properties of the search process, or a combination thereof.

It is noted that polynomials include uniquely synthesized elements orthogonal to each other. The polynomials, by definition, represent deductive closures in the domain they encode. However, since the elements of a polynomial are orthogonal, they can represent unique elements within the original information domain. Therefore, the polynomial elements can constitute deductive set of the original information.

In one embodiment, the standard pipeline generation platform 103 may be equipped with specific user interfaces for the developers. A developer user interface may provide sets of pre-computed polynomials, algorithms, scripts, or a combination thereof bounded by the Extraction-Transformation-Load (ETL) pipeline construction process to enable the developer to reuse the pre-computed components and improve efficiency of the pipeline generation process.

The processes described herein for providing standard information processing pipelines may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
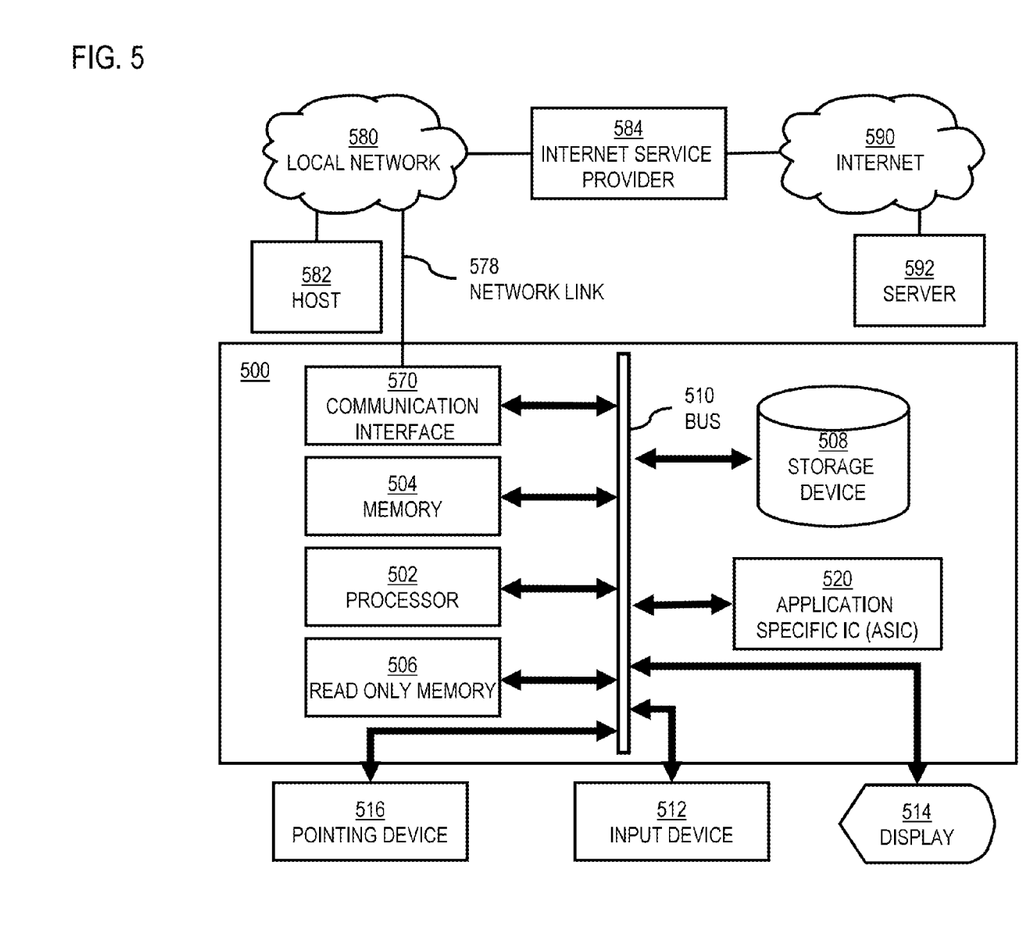
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide standard information processing pipelines as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of providing standard information processing pipelines.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to providing standard information processing pipelines. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for providing standard information processing pipelines. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing standard information processing pipelines, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for providing standard information processing pipelines to the services/applications 109 provided on UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to provide standard information processing pipelines as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of providing standard information processing pipelines.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide standard information processing pipelines. The memory 605 also stores the data associated with or generated by the execution of the inventive steps.

Figure 7:
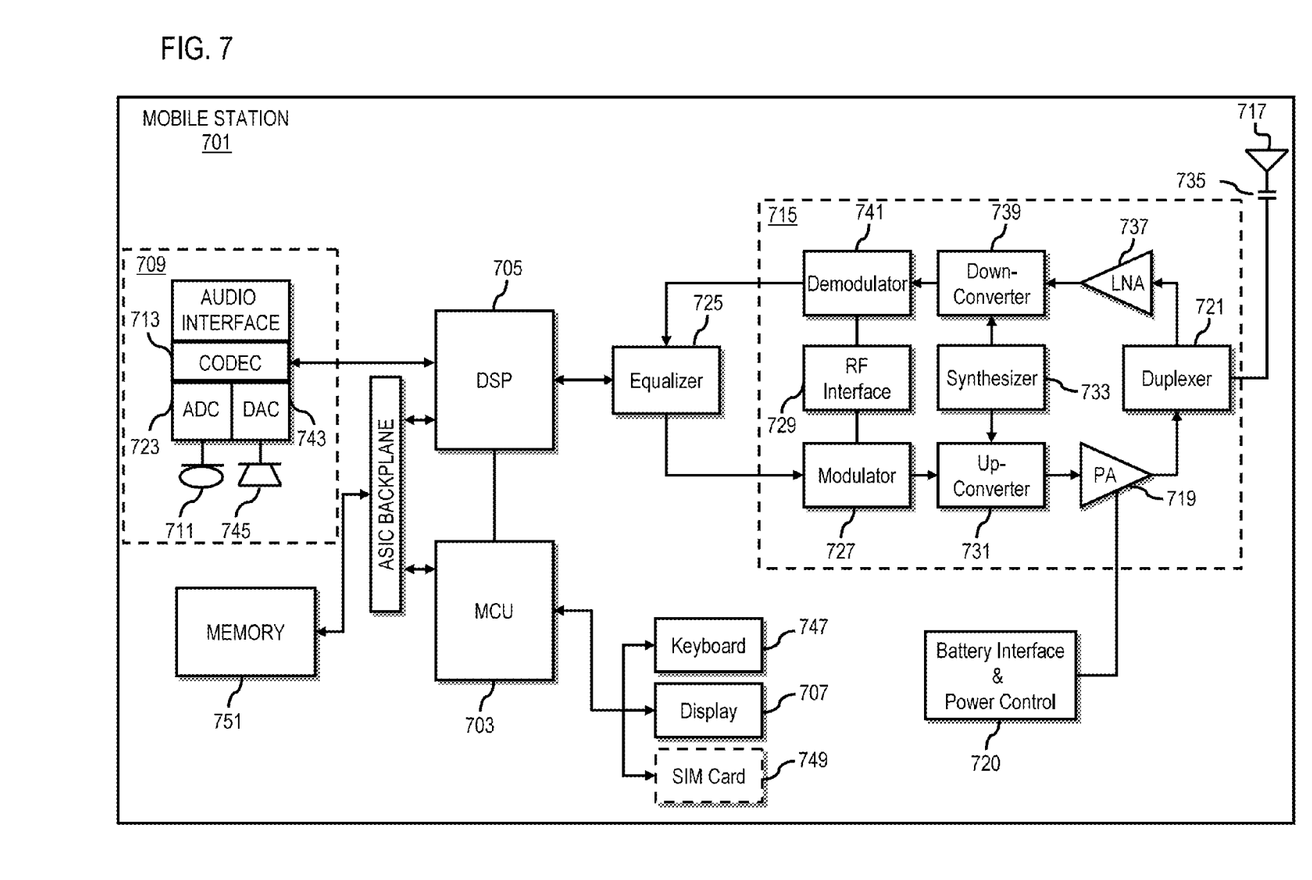
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of providing standard information processing pipelines. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing standard information processing pipelines. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to provide standard information processing pipelines. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    processing of one or more information sources to cause, at least in part, an extraction of one or more components of a lossless decomposition of a serialized information stream;
    transforming of the one or more components of the lossless decomposition of the serialized information stream into one or more isomorphic representations, wherein the one or more isomorphic representations include, at least in part, one or more irreducible polynomials;
    compiling of one or more data repositories comprising, at least in part, the one or more isomorphic representations, wherein the one or more data repositories are available for processing by one or more services, one or more applications, or combination thereof; and
    loading of the one or more data repositories, the one or more isomorphic representations, or a combination thereof into the one or more information sources following the processing.

2. A method of claim 1, wherein the one or more components of the lossless decomposition of the serialized information stream are associated with one or more different domains.

3. A method of claim 1, further comprising:
    aggregating of one or more queries to determine the one or more components of the lossless decomposition of the serialized information stream.

4. A method of claim 3, wherein the one or more queries, the aggregation of the one or more queries, or a combination thereof delimit one or more equivalence classes, and wherein the extraction is based, at least in part, on the equivalence classes.

5. A method of claim 1, further comprising:
    generating of the one or more irreducible polynomials based, at least in part, on one or more factoring algorithms.

6. A method of claim 1, further comprising:
    determining one or more degrees for the generation of the one or more irreducible polynomials based, at least in part, on resource availability information.

7. A method of claim 1, further comprising:
    encoding of the one or more components of the lossless decomposition of the serialized information stream in the one or more isomorphic representations,
    wherein information associated with the one or more components of the lossless decomposition of the serialized information stream are protected from disclosure by the one or more isomorphic representations based, at least in part, on the encoding.

8. A method of claim 1, wherein the extraction, the transformation, the loading, or a combination thereof define, at least in part, an analytics pipeline among the one or more information sources, one or more systems associated with the one or more information sources, or combination thereof.

9. A method of claim 1, wherein the transformation is bi-directional with respect to a first set of one or more domains associated with the one or more information sources and a second set of one or more domains associated with the one or more data repositories, the one or more isomorphic representation, or a combination thereof.

10. An apparatus comprising:
    at least one processor; and
    at least one memory including computer program code for one or more programs,
    the at least one memory and the computer program code configured to, with the at least one processor, cause the apparatus to perform at least the following,
        process and/or facilitating a processing of one or more information sources to cause, at least in part, an extraction of one or more components of a lossless decomposition of a serialized information stream;
        cause, at least in part, a transformation of the one or more components of the lossless decomposition of the serialized information stream into one or more isomorphic representations, wherein the one or more isomorphic representations include, at least in part, one or more irreducible polynomials;
        cause, at least in part, a compilation of one or more data repositories comprising, at least in part, the one or more isomorphic representations, wherein the one or more data repositories are available for processing by one or more services, one or more applications, or combination thereof; and
        cause, at least in part, a loading of the one or more data repositories, the one or more isomorphic representations, or a combination thereof into the one or more information sources following the processing.

11. An apparatus of claim 10, wherein the one or more components of the lossless decomposition of the serialized information stream are associated with one or more different domains.

12. An apparatus of claim 10 wherein the apparatus is further caused to:
    determine one or more queries over the one or more information sources; and
    cause, at least in part, an aggregation of the one or more queries to determine the one or more components of the lossless decomposition of the serialized information stream.

13. An apparatus of claim 12, wherein the one or more queries, the aggregation of the one or more queries, or a combination thereof delimit one or more equivalence classes, and wherein the extraction is based, at least in part, on the equivalence classes.

14. An apparatus of claim 10, wherein the apparatus is further caused to:

cause, at least in part, a generation of the one or more irreducible polynomials based, at least in part, on one or more factoring algorithms.

15. An apparatus of claim 10, wherein the apparatus is further caused to:
determine one or more degrees for the generation of the one or more irreducible polynomials based, at least in part, on resource availability information.

16. An apparatus of claim 10, wherein the apparatus is further caused to:
cause, at least in part, an encoding of the one or more components of the lossless decomposition of the serialized information stream in the one or more isomorphic representations,
wherein information associated with the one or more components of the lossless decomposition of the serialized information stream are protected from disclosure by the one or more isomorphic representations based, at least in part, on the encoding.

17. An apparatus of claim 10, wherein the extraction, the transformation, the loading, or a combination thereof define, at least in part, an analytics pipeline among the one or more information sources, one or more systems associated with the one or more information sources, or combination thereof.

18. An apparatus of claim 10, wherein the transformation is bi-directional with respect to a first set of one or more domains associated with the one or more information sources and a second set of one or more domains associated with the one or more data repositories, the one or more isomorphic representation, or a combination thereof.

* * * * *